US006934833B2

(12) United States Patent
Larvoire

(10) Patent No.: US 6,934,833 B2
(45) Date of Patent: Aug. 23, 2005

(54) OPERATING SYSTEM SELECTOR AND DATA STORAGE DRIVE

(75) Inventor: Jean-Francois Larvoire, Meylan (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 158 days.

(21) Appl. No.: 10/608,897

(22) Filed: Jun. 27, 2003

(65) Prior Publication Data

US 2004/0068645 A1 Apr. 8, 2004

(30) Foreign Application Priority Data

Jun. 28, 2002 (EP) .............................................. 02354103

(51) Int. Cl.[7] .................................................. G06F 9/06
(52) U.S. Cl. .................................. 713/1; 713/2; 710/74
(58) Field of Search .......................... 713/1, 2; 710/74

(56) References Cited

U.S. PATENT DOCUMENTS

| 5,887,163 | A | | 3/1999 | Nguyen et al. ............. 395/652 |
| 6,615,365 | B1 | * | 9/2003 | Jenevein et al. ................ 714/6 |
| 6,711,591 | B1 | * | 3/2004 | Rafanello et al. .......... 707/200 |
| 6,862,681 | B2 | * | 3/2005 | Cheston et al. ................ 713/2 |
| 2003/0177329 | A1 | * | 9/2003 | Larvoire et al. ............ 711/173 |
| 2004/0158711 | A1 | * | 8/2004 | Zimmer ...................... 713/165 |
| 2004/0255106 | A1 | * | 12/2004 | Rothman et al. ............... 713/1 |

FOREIGN PATENT DOCUMENTS

WO    00/16193    3/2000

OTHER PUBLICATIONS

Matzigkeit, G., et al., "The GRUB Manual," *The GRand Unified Bootloader*, Version 0.93 (Jul. 4, 2002).
Zynel, M., "Multi–booting Solaris and other operating systems," pp. 1–48 (Nov. 11, 2001).
*Extensible Firmware Interface Specification*, Intel, Version 1.02, pp. 1–5, 9–14, & 305–326 (Dec. 12, 2000).
*UNIX Developer's Interface Guide for Intel–Based Servers (UDIG)*, Version 1.0, pp. I–V & 2–1–2–4.

* cited by examiner

*Primary Examiner*—Jeffrey Gaffin
*Assistant Examiner*—Harold Kim

(57) ABSTRACT

An operating system selector operable to boot a non-EFI compatible operating system where the operating system files are stored in a GPT partition of a data storage drive, the data storage drive having a first address set, the operating system selector being operable to read a GUID partition table to identify address information relating to the GPT partition, define the GPT partition as a virtual data storage drive having a second address set, call an address mapper and pass the address information to the address mapper, and perform a loading step to boot the operating system.

16 Claims, 3 Drawing Sheets

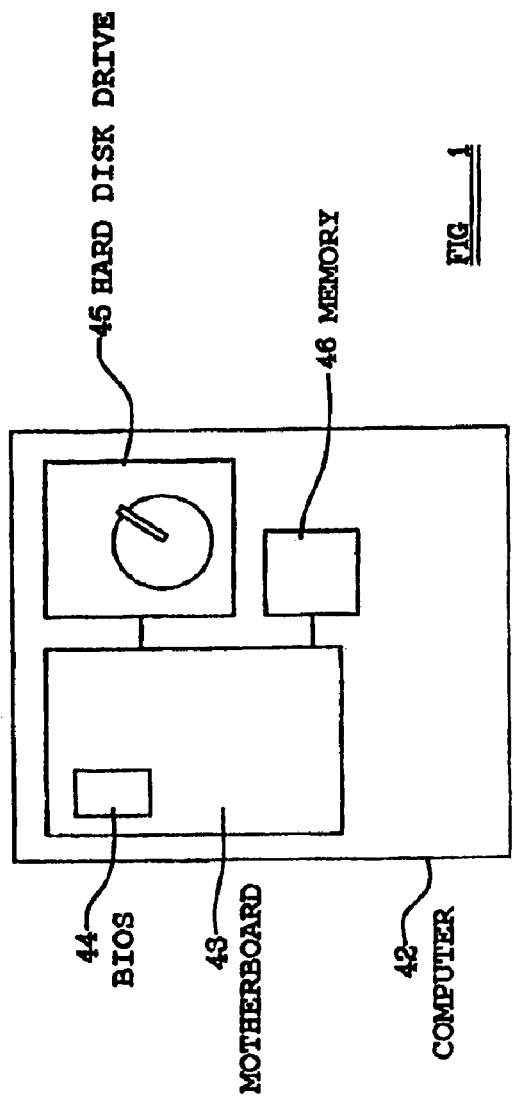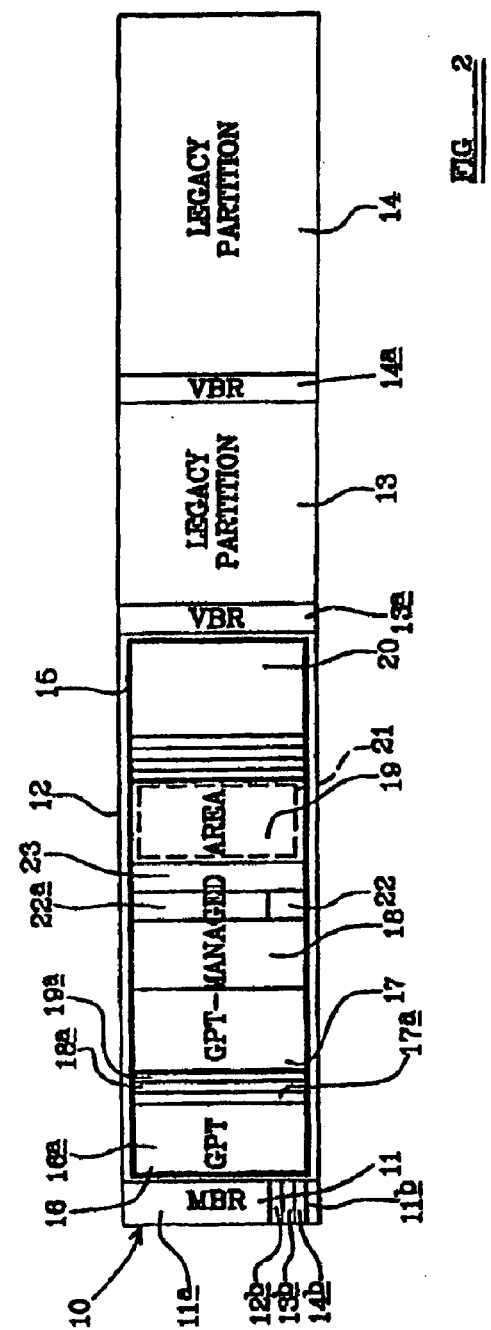

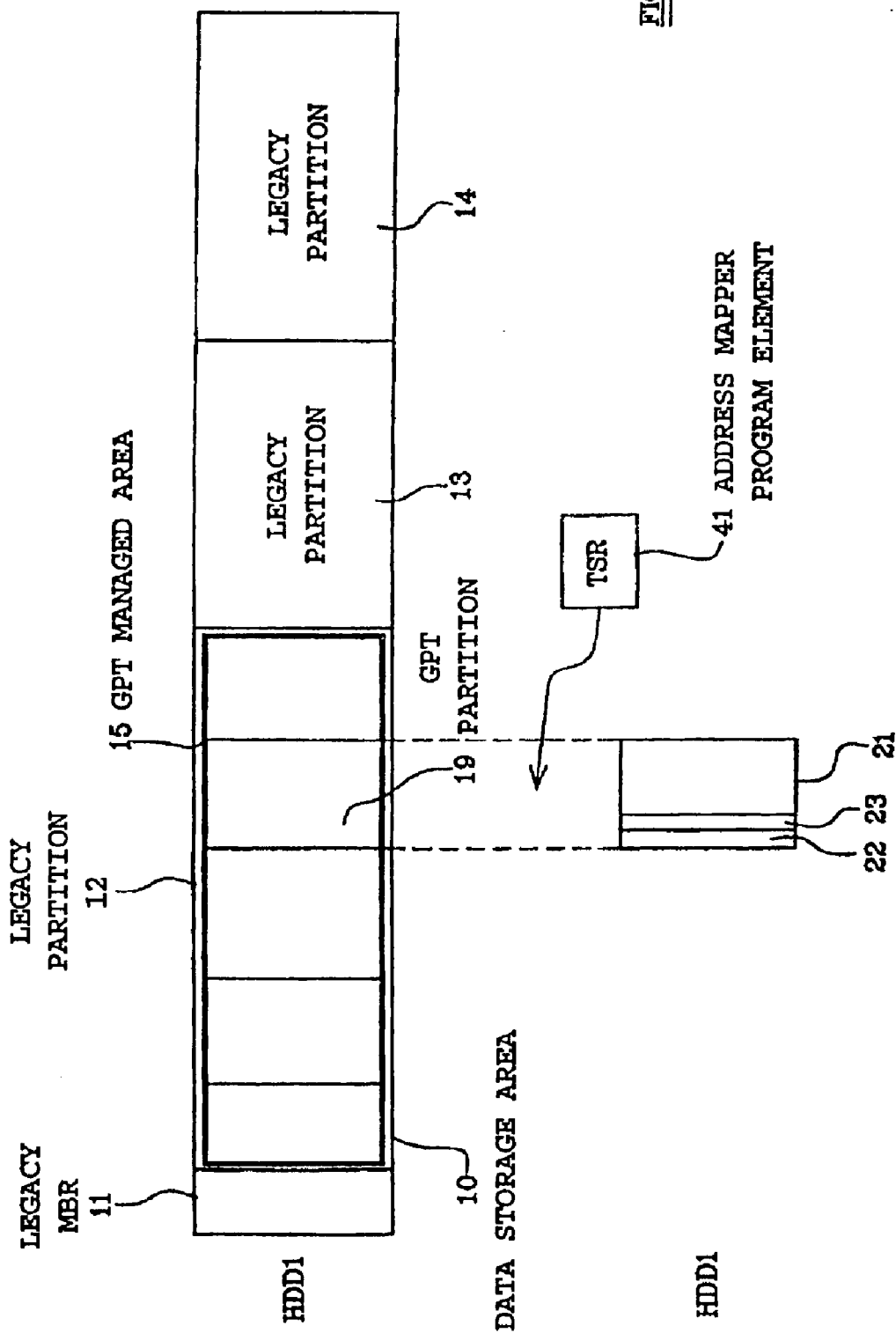

OPERATING SYSTEM SELECTOR AND DATA STORAGE DRIVE

FIELD OF THE INVENTION

This invention relates to an operating system selector, and a data storage drive provided with an operating system selector, a computer provided with an operating system selector, a computer provided with a data storage drive, and a method of booting an operating system.

BACKGROUND OF THE INVENTION

When a computer boots from a hard disk drive, it is necessary for the computer's BIOS to be able to identify a bootable or active partition from which an operating system ("OS") can be booted. Conventionally, a hard disk may be divided into up to four main partitions. When booting from a hard disk, the BIOS will read a master boot record ("MBR"), conventionally located at the first sector or first logical block address (LBA 0) of the disk. The master boot record contains a table which contains descriptions of the main partitions. One of the main partitions is conventionally marked as active, indicating that it is a "bootable" partition which should be used for booting up. The boot code portion contains a piece of code referred to as an "OS loader" which loads the kernel files of the operating system into memory from the bootable partition. However, where two or more potentially bootable main partitions are provided, for example where two different operating systems are stored in separate partitions, it is known to provide a boot code which is stored on the disk and which is operable to generate a boot menu enabling a user to select a preferred operating system.

To overcome the limitation to four primary partitions, specifications such as the Intel Extensible Firmware Interface (EFI) specification have been defined. In accordance with the EFI specification, a very large number of partitions may be defined, each identified by a globally unique identifier (GUID), a 128 bit number. A partition table, referred to as a GPT or GUID partition table, lists each of the partitions, including their beginning and end addresses and information identifying the contents or function of the partition where desired. It is possible for an MBR partition table and the (up to) four main partitions to co-exist on the same disk with EFI partitions and a GPT by defining one of the main partitions as a GPT-managed area and locating the GPT partitions in the GPT-managed area If a BIOS which is not compatible with the EFI specification attempts to boot from the hard disk, it will read the master boot record and bootable main partitions in conventional manner while ignoring the main partition holding the EFI-configured GPT and GPT partitions. The GPT specification is advantageous in that it permits up to $2^{64}$ sectors of a disk to be addressed.

Where a BIOS is compatible with the EFI specification, it is operable to read both GPT's and the MBR partition table, hereinafter referred to as a legacy MBR partition table, to identify both bootable GPT partitions and bootable primary partitions, hereinafter referred to as "legacy" partitions, and generates a boot menu. In accordance with the EFI specification, the boot code contained in the legacy NBR is not run, but instead a specific root directory is specified where operating system loader programs may be found.

It is desirable that the advantages of GPT partitions become available as soon as possible, even on computers where the BIOS and operating system is incompatible with the EFI specification. Where however an operating system's files are stored in a GPT partition, on boot the operating system loader and operating system kernel will be unable to find the expected files because of the different disk structure and disk addressing system.

An aim of the invention is to provide a new or improved method whereby a non-EFI compatible operating system may be booted from GPT partition.

SUMMARY OF THE INVENTION

According to a first aspect of the invention, we provide an operating system selector operable to boot a non-EFI compatible operating system where the operating system files are stored in a GPT partition of a data storage drive, the data storage drive having a first address set, the OS selector being operable to read a GUID partition table to identify address information relating to the GPT partition, define the GPT partition as a data storage drive having a second address set, call an address mapper and pass the address information to the address mapper, and perform a loading step to boot the operating system.

The operating system selector may be operable to read the data storage drive to identify bootable legacy partitions and bootable GPT partitions, and generate a boot menu in accordance with the identified bootable partitions.

The OS selector may comprise a boot code stored in a legacy master boot record of the data storage drive.

The loading step may comprise the step of reading a further legacy master boot record of the GPT partition, loading a legacy boot code into memory and passing control to the legacy boot code.

The address mapper may be operable to hook commands to access the data storage drive, and, where the command comprises an address in the second address set, to map the address to the corresponding address of the first address set.

The address mapper may be a terminate and stay resident program.

The GPT partition type may comprise a partition type which is the image of a legacy hard disk drive and wherein the step of defining the GPT partition as a data storage drive may comprise the step of setting a BIOS drive number corresponding to the GPT partition to 80 H.

Alternatively, the GPT partition may comprise a partition type which is the image of a legacy floppy disk and wherein the step of defining the GPT partition as a data storage drive may comprise the step of setting a BIOS drive number corresponding to the GPT partition to 0 H.

The step of defining the GPT partition as a virtual data storage drive may be performed by the address mapper.

According to a second aspect of the invention, we provide a data storage drive comprising a data storage area, the data storage area comprising a legacy master boot record comprising an operating system selector according to any one of the preceding claims, and a GPT-managed area comprising at least one GPT partition comprising files of an operating system.

The data storage drive GPT partition may comprise a further legacy master boot record.

The data storage drive may comprise at least one legacy partition.

The data storage drive may comprise a hard disk drive.

The present invention thus allows a non-EFI compatible operating system to be booted from a GPT partition without modification to the operating system itself or of the BIOS of the computer. The advantages can be made available now even when the operating system or BIOS themselves are not EFI compatible.

According to a third aspect of the invention, we provide a computer comprising an operating system selector, the operating system selector being operable to boot a non-EFI compatible operating system where the operating system files are stored in a GPT partition of a data storage drive, the operating system selector being operable to read a GUID partition table to identify address information relating to the GPT partition, define the GPT partition as a virtual data storage drive, call an address mapper and pass the address information to the address mapper, and perform a loading step to boot the operating system.

According to a fourth aspect of the invention, we provide a computer comprising memory and a data storage drive, the data storage drive comprising a GPT partition, the computer being operable to load an operating system selector into the memory and run the operating system selector, the operating system selector being operable to operable to boot a non-EFI compatible operating system where the operating system files are stored in the GPT partition of the data storage drive, the operating system selector being operable to read a GUID partition table to identity address information relating to the GPT partition, define the GPT partition as a virtual data storage drive, call an address mapper and pass the address information to the address mapper, and perform a loading step to boot the operating system.

According to a fifth aspect of the invention, we provide a method of booting a non-EFI compatible operating system when the operating system files are stored in a GPT partition of a data storage drive, the data storage drive, the method comprising the steps of reading a GUID partition table to identify address information relating to the GPT partition, defining the GPT partition as a virtual data storage drive, calling an address mapper and pass the address information to the address mapper, and performing a loading step to boot the operating system.

BRIEF DESCRIPTION OF THE DRAWING

An embodiment of the invention will now be described by way of example only with reference to the accompanying drawings, wherein;

FIG. 1 is a diagrammatic illustration of a computer comprising a data storage drive.

FIG. 2 is a diagrammatic illustration of a data storage drive embodying the present invention, FIG. 4 is a further diagrammatic illustration of the data storage drive of FIG. 2.

DETAILED DESCRIPTION OF THE PREFERRED EMBODIMENTS

Figure 3:
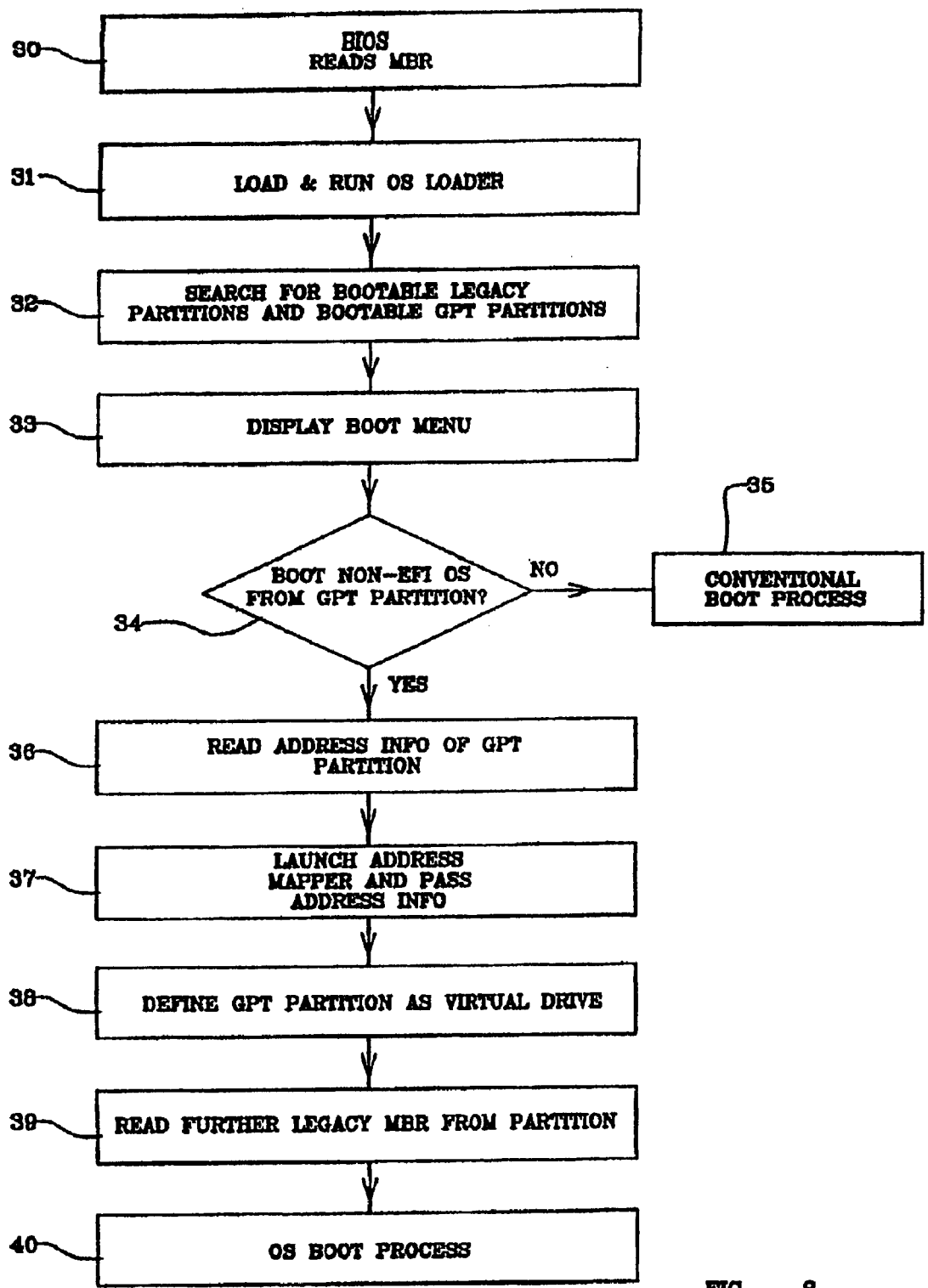
FIG. 3 is a flow diagram illustrating a method embodying the present invention.

As shown in FIG. 1, a compute is diagrammatically illustrated at 42. The computer comprises a motherboard 43 provided with a BIOS 44 in conventional manner, and a data storage drive, in the present example a hard disk drive 45 which is addressed by the Interrupt 13*h* of the BIOS 44 in conventional manner, and a memory 46.

Referring now to FIG. 2, a diagrammatic illustration of a data storage area of a data storage drive is shown in the present example a hard disk drive 45 of FIG. 1. The first sector or each block of the data storage area 10 comprises a master boot record 11 in conventional manner, hereinafter referred to as a legacy MBR 11. The legacy MBR comprises a first part comprising boot code including an operating system selector 11*a*, hereinafter referred to as an "OS selector" which is loaded into memory 46 by the BIOS and run during each boot process: and a partition table hereinafter referred to as a legacy partition table 11*b*. The data storage area 10 is divided in conventional manner into three partitions 12, 13, 14 hereinafter referred to as legacy partitions. The partitions 13, 14, are provided with volume boot records 13*a*, 14*a* in conventional manner. The partition 12 comprises a GUID partition table ("GPT") managed area 15 which is nested within the legacy partition 12 in known manner. The legacy partition table 11*b* comprises entries 12*b*, 13*b*, 14*b* corresponding to each legacy partition 12, 13, 14, including the start address of each legacy partition 12, 13, 14.

Referring now to the GPT managed area 15, a partition table comprising a GUID partition table (GPT) 16 is provided at the start of the GPT managed area 15, comprising a GPT header 16*a*. The GPT-managed area 15 comprises a plurality of GPT partitions 17, 18, 19, each of which has a corresponding entry 17*a*, 18*a*, 19*a* in the GPT 16. Each GPT partition entry 17*a*, 18*a*, 19*a*, comprises information relating to the corresponding partition, including a partition type GUID, a unique GUID identifying that partition, the start and end addresses which in the EFI comprise logical block: addresses, EFI attribute information and a partition name of up to 36 characters. The partition type GUID is a GUID which indicates the file structure used in that partition. At the end of the GPT managed area 16, a backup GPT 20 is provided in conventional manner, which duplicates the contents of the GPT 16 such that if the GPT 16 is corrupted or invalid the GPT managed area 15 may still be addressed using information in the backup GPT 20.

In the present example, one of the GPT partitions, partition 19 contains the files for a non-EFI compatible operating system 21. The partition 19 is further provided with a further legacy master boot record 22 and a volume boot record 23 in like manner to the boot records 13*a*, 14*a*. The further legacy MBR 22 contains a legacy boot code comprising an OS loader 22*a*. The GPT partition 19 will be of appropriate partition type suitable for the type of disk image stored within it. In the present example, the operating system 21 comprises MS-DOS (TM) installed on a legacy hard disk image and the partition type is advantageously of the standard EFI GPT partition type 024DFE41-A-33E7-11D3-9D69-0008C781F39F. This partition type is the exact image of a legacy hard disk and indicates the presence of a legacy MBR in the partition.

Referring now to FIGS. 3 and 4, the present embodiment is operated as follows. At step 30, as part of the boot process the BIOS will read the legacy MBR 11 in conventional manner, and at step 31 will load and run the operating system selector 11*a* as it would for any boot code stored in the legacy MBR 11. The OS selector 11*a* is operable at step 32 to search the data storage area 10 for bootable legacy partitions and bootable GPT partitions. Bootable legacy partitions may be identified from the corresponding entry in the legacy MBR partition table 11*b* where a boot indicator byte is set to 80*h* in conventional manner, whilst bootable partitions in the GPT managed area 15 will be identified by reading the GPT 16 to identify GPT partitions of the right partition type. At step 33, a boot menu is displayed comprising both GPT and legacy bootable partitions which have identified by the OS selector 11*a*. A user may select an option from the boot menu. In the case of the user selecting, for example, an operating system located in a legacy partition 13, 14, the rest of the OS boot process proceeds in conventional manner as shown at step 35.

If the user decides to use a non-EFI operating system stored in a GPT partition, in this example the operating system 21 held in the GPT partition 19, the OS selector 11a will retrieve address information, for example the start address and partition length expressed in logical block addresses, from the GPT 16 at step 36. At step 37, the OS selector 11a launches an address mapper program element shown at 41 in FIG. 4 and passes the address information to the address mapper. The address mapper 41 in this case is a terminate and stay resident (TSR) program which is able to hook calls to the BIOS interrupt 13h in conventional manner. At step 38, the address mapper 41 identifies the partition 19 as a separate, virtual, disk drive. The BIOS drive identifier is set to the appropriate value, for example 80h for a partition type which is the image of a legacy hard disk. If necessary, the drive identifier for the data storage drive 43 should be re-mapped, for example from 80h to 81h, and any other physical data storage drives should be re-mapped accordingly. The data storage area 10 will have a first set address which begins at logical block address 0, and extends, in this example to the final logical block address of partition 14. The virtual data storage drive equivalent to partition 19 will have a second address set, also beginning at logical block address 0 and extending up to the address equivalent to the length of the partition 19. It will be apparent that step 38 may alternatively be performed by the OS selector 11a.

At step 39, the OS selector 11a will read the further legacy master boot record 22 of the partition area 19, load the legacy boot code comprising a legacy OS loader 22a into the standard address, for example 0:7C008 and at step 40 transfers control to the legacy OS loader 22a.

With reference to FIG. 4, when the operating system 21 boots the computer will apparently have two drives, in this example HDD0 and HDD1. The main drive, HDD0 will be the virtual data storage drive corresponding to GPT partition 19. The physical drive will appear at HDD1. The operating system 21 will boot from the virtual drive HDD0 in conventional manner. That is, the legacy OS loader 22a will read the legacy partition table 22b and will identify the virtual drive HDD0 as having one bootable partition in conventional manner. The operating system 21 will be able to read at least partitions 13 and 14 of HDD1 since the legacy MDR 11 will be readable by the operating system 21 in conventional manner.

When the operating system 21 or an application attempts to write to HDD0, the address mapper program 41 will trap all the appropriate Interrupt 13h commands addressed to virtual drive HDD0 having an address in the second address set and map them to the corresponding address in the first address set of the physical drive 45. The mapping between the first address set and the second address set may be done in any appropriate fashion as desired. For example, the OS selector 11a will know the relative offset of the partition 19 from LBA0 of HDD1. Where a command is directed to an address on HDD0 the address mapper program 41 may simply add the offset to the address in the second address set to get the corresponding address of the first address set.

It will be apparent that multiple partitions may be identified as separate virtual drives. It might be envisaged that a legacy operating system would be installed in one GPT partition, diagnostic tools in another GPT partition and the results of a diagnostic process written to a third GPT partition all defined as separate virtual drives. Although the present invention has been discussed with reference to conventional hard disk drives, it will be apparent that the invention is applicable to any data storage drive type where it is desired to boot an incompatible legacy operating system. It will also be apparent that the partition type may be any other type as suitable, for example the proposed GPT partition type 3C0A9D61-3F0A11D5-9326-3833C4CA9839 which is the image of a legacy floppy disk drive. If the GPT partition is of this partition type, a virtual floppy disk 00 H is created and the BIOS identifier for a physical floppy disk drive should be re-mapped to 01 H and following.

Although the present invention is intended for unmodified non-EFI compatible BIOS's, it will be apparent that where the BIOS is EFI compatible, the present invention may still be used and sill allow non-PFT compatible operating systems to run as described hereinbefore. At the same time, EFI-compatible operating systems on the same drive or disk will function normally using standard EFI loaders stored in the GPT system partition.

The present invention thus creates a virtual drive at the BIOS interface level, where the content of the virtual drive are the contents of the GPT partition from which it is desired to boot. The virtual drive requires no change to the operating system kernel or the BIOS and is indeed independent of the operating system. This allows legacy systems to co-exist with EFI-compatible data storage drives and will ease the transition to EFI-compatible systems.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result; as appropriate, may, separately, or in any combination of such features, be utilised for realising the invention in diverse forms thereof.

What is claimed is:

1. An operating system selector operable to boot a non-EFI compatible operating system where the operating system files are stored in a GPT partition of a data storage drive, the data storage drive having a first address set,
the operating system selector being operable to;
read a GUID partition table to identify address information relating to the GPT partition,
define the GPT partition as a virtual data storage drive having a second address set,
call an address mapper and pass the address information to the address mapper, and
perform a loading stop to boot the operating system.

2. An operating system selector according to claim 1 operable to read the data storage drive to identify bootable legacy partitions and bootable GPT partitions, and generate a boot menu in accordance with the identified bootable partitions.

3. An operating system selector according to claim 1 wherein the OS selector comprises a boot code stored in a legacy master boot record of the data storage drive.

4. An operating system selector according to claim 1 wherein the loading step comprises reading a further legacy master boot record of the GPT partition, loading the legacy boot code into memory and passing control to the legacy boot code.

5. An operating system selector according to claim 1 wherein the address mapper is operable to hook commands to access the data storage drive, and, wherein the command comprises an address in the second address set, to map the address to the corresponding address of the first address et.

6. An operating system selector according to claim 5 wherein the address mapper is a terminate and stay resident program.

7. An operating system selector according to claim 1 wherein the GPT partition type comprises a position type which is the image of a legacy hard disk drive and wherein the step of defining the GPT partition as data storage drive comprises the step of setting a BIOS drive identification number corresponding to the GPT partition to 80h.

8. An operating system selector according to claim 1 wherein the GPT partition comprises a partition type which is the image of a legacy floppy disk and wherein the step of defining the GPT position as a data storage drive comprises the step of setting a BIOS drive identification number corresponding to the GPT partition to 0h.

9. An operating system selector according to claim 7 wherein the address mapper is operable to perform the step of defining the GPT partition as a virtual data storage device.

10. A data storage drive comprising a data storage area, the data storage area comprising a master boot record comprising an operating system selector according to any one of the preceding claims, and a GPT-managed area comprising at least one GPT partition comprising files of an operating system.

11. A data storage drive according to claim 10 wherein the GPT partition comprises a further legacy master boot record.

12. A data storage drive according to claim 10 wherein the data storage area comprises at least one legacy partition.

13. A storage drive according to claim 10 comprising a hard disk drive.

14. A computer comprising an operating system selector, the operating system selector being operable to boot a non-EFI compatible operating system where the operating system files are stored in a GPT partition of a data storage drive, the operating system selector being operable to;

read a GUID partition table to identify address information relating to the GPT partition, define the GPT partition as a virtual data storage drive, call an address mapper and pass the address information to the address mapper, and perform a loading step to boot the operating system.

15. A computer comprising memory and a data storage drive, the data storage drive comprising a GPT partition, the computer being operable to load an operating system selector into the memory and run the operating system selector, the operating system selector being operable to operable to boot a non-EFI compatible operating system where the operating system files are stored in the GPT partition of the data storage drive, the operating system selector being operable to;

read a GUTD partition table to identify address information relating to the GPT partition, define the GPT partition as a virtual data storage drive, call an address mapper and pass the address information to the address mapper, and perform a loading step to boot the operating system.

16. A method of booting a non-FFI compatible operating system when the operating system files are stored in a GPT partition of a data storage drive, the data storage drive, the method comprising the steps of;

reading a GUID partition table to identify address information relating to the GPT partition, defining the GPT partition as a virtual data storage drive, calling an address mapper and passing the address information to the address mapper, and performing a loading step to boot the operating system.

* * * * *